US 9,247,382 B2

(12) United States Patent
Guo et al.

(10) Patent No.: US 9,247,382 B2
(45) Date of Patent: Jan. 26, 2016

(54) METHODS AND SYSTEMS FOR USER EQUIPMENT POSITIONING USING INTERCELL INTERFERENCE COORDINATION

(71) Applicant: Telefonaktiebolaget L M Ericsson (publ), Stockholm (SE)

(72) Inventors: Ning Guo, Kanata (CA); Gary Boudreau, Kanata (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/302,026

(22) Filed: Jun. 11, 2014

(65) Prior Publication Data
US 2014/0295882 A1 Oct. 2, 2014

Related U.S. Application Data

(63) Continuation of application No. 13/124,010, filed as application No. PCT/IB2010/001243 on May 26, 2010, now Pat. No. 8,755,355.

(51) Int. Cl.
H04W 4/00 (2009.01)
H04W 64/00 (2009.01)
H04W 4/02 (2009.01)
G01S 5/02 (2010.01)
H04W 24/10 (2009.01)
H04W 92/20 (2009.01)

(52) U.S. Cl.
CPC .. *H04W 4/02* (2013.01); *G01S 5/02* (2013.01); *G01S 5/0205* (2013.01); *H04W 24/10* (2013.01); *H04W 64/00* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 2003/0166407 | A1 | 9/2003 | Qian et al. |
| 2009/0111503 | A1 | 4/2009 | Pedersen et al. |
| 2009/0268684 | A1 | 10/2009 | Lott et al. |
| 2010/0216450 | A1 | 8/2010 | Fujishima et al. |
| 2010/0273506 | A1 | 10/2010 | Stern-Berkowitz et al. |
| 2011/0117926 | A1 | 5/2011 | Hwang et al. |
| 2012/0320845 | A1 | 12/2012 | Choi et al. |

FOREIGN PATENT DOCUMENTS

WO 2010/036188 A1 4/2010

OTHER PUBLICATIONS

International Search Report for PCT/IB2010/001243 mailed Feb. 18, 2011.
Written Opinion for PCT/IB2010/001243 mailed Feb. 18, 2011.
Written Opinion of the International Preliminary Examining Authority in corresponding International Application No. PCT/IB2010/001243 mailed May 24, 2012.

(Continued)

*Primary Examiner* — Eunsook Choi
(74) *Attorney, Agent, or Firm* — Patent Portfolio Builders PLLC

(57) ABSTRACT

Methods, devices and systems for determining positions of user equipments (UEs) based on uplink position signals are described. Cooperating base stations measure received positioning signals and report measurements to serving base stations. Cooperating base stations can also adapt resource allocation to mitigate interference on the uplink to positioning signals. Cooperation between base stations can be coordinated via inter-base station links, e.g., X2 interfaces in LTE systems.

19 Claims, 12 Drawing Sheets

(56) References Cited

OTHER PUBLICATIONS

International Preliminary Report on Patentability in corresponding International Application No. PCT/IB2010/001243 mailed Aug. 10, 2012.
3GPP, "3rd Generation Partnership Project; Technical Specification Group Radio Access Network; Evolved Universal Terrestrial Radio Access (E-UTRA); LTE Positioning Protocol (LPP) (Release 9)," Technical Specification, 3GPP TS 36.355 v.9.0.0, Dec. 2009, pp. 1-102.
Ericsson, "Further details on DI OTDOA," R1-091312, 3GPP TSG RAN WG1 Meeting #56bis, Seoul, South Korea, Mar. 23-27, 2009, pp. 1-6, XP-002557365.
Huawei, et al., "Clarification on positioning procedure," R2-100969, 3GPP TSG RAN2 WG2 Meeting #69, San Francisco, CA, USA, Feb. 22-26, 2010, pp. 1-3, XP-050421535.
Huawei, "Interference analysis on SRS for CoMP," R1-093039, 3GPP TSG RAN WG1 Meeting #58, Shenzhen, P.R. China, Aug. 24-28, 2009, pp. 1-4, XP-050351432.
Vodafone, et al., "QoS Support based on Intercell Interference Coordination," R2-075030, 3GPP TSG RAN WG2#60, Jeju, Korea, Nov. 5-9, 2007, pp. 1-2, XP-050137511.

METHODS AND SYSTEMS FOR USER EQUIPMENT POSITIONING USING INTERCELL INTERFERENCE COORDINATION

CROSS-REFERENCE TO RELATED APPLICATIONS

This application is a continuation of U.S. patent application Ser. No. 13/124,010, filed on Apr. 13, 2011, entitled "Methods and Systems for User Equipment Positioning Using Intercell Interference Coordination", which is related to, and claims priority from a 371 Application of PCT/IB2010/001243, filed on May 26, 2010, entitled "Methods and Systems for User Equipment Positioning Using Intercell Interference Coordination", the disclosure of which is incorporated here by reference.

TECHNICAL FIELD

The present invention relates generally to communications and in particular to methods, devices and systems associated with determining a position of user equipment involving coordination of intercell interference.

BACKGROUND

The growth of commercial radiocommunications and, in particular, the explosive growth of cellular radiotelephone systems have changed the ways in which people communicate. Many of the people who purchase mobile communication units and service subscriptions do so to enhance their personal security. Presumably, many of these subscribers expect to use their mobile units to aid them in urgent situations, e.g., when their vehicle has become disabled or in an emergency situation requiring rapid medical and/or police response. In these circumstances it is desirable that the radiocommunication system is able to independently determine a location of the mobile unit (also commonly called a user equipment (UE)), particularly in the case where the subscriber does not know his or her precise location. Moreover, many countries have implemented communications laws which require that radiocommunication networks possess a positioning capability that enables network operators to, for example, forward the position of an emergency caller to an emergency service provider.

There are many techniques available to generate mobile unit positioning information. In a first category, the mobile unit could estimate its own position and send a message with its coordinates when placing an emergency call or responding to a location request. This could be accomplished by, for example, providing the mobile unit with a Global Positioning System (GPS) receiver that receives location information from the GPS satellite network. The mobile unit can then transmit this information to the system, which would then forward it to the emergency service provider.

Alternatively, the base stations which transmit signals to, and receive signals from, the mobile units could be used to determine the mobile unit's location. Various techniques, including attenuation of a mobile unit's signal, angle-of-arrival, and difference between the time-of-arrival (TDOA) of a mobile unit's signal at different base stations, have been suggested for usage in providing mobile unit location information.

A third category of strategies for locating mobile units in radiocommunication systems involves the provision of an adjunct system, i.e., a system which may be completely independent of the radiocommunication system or which may share various components (e.g., an antenna) with the radiocommunication system but which processes signals separately therefrom. Such adjunct units are sometimes called Location Measurement Units (LMUs) and may or may not be physically co-located with the base stations in the radiocommunication networks. One drawback of using adjunct systems is the added cost associated with implementing a separate network solely for positioning purposes and the challenges associated with integrating the radiocommunication system with the separate adjunct system.

In the last 15 years or so since positioning has become a required capability for network operators and manufacturers, various positioning strategies have been selected for each standardized radiocommunication system. The particular selection of one or more positioning techniques for a given radiocommunication system is due, at least in part, to their compatibility with the underlying radio technologies used to establish voice and data connections in that radiocommunication system, as well as their accuracy and failure rates.

For example, in the next generation Long Term Evolution (LTE) system, the associated standard currently provides for positioning to be implemented using one of: an Observed Time Difference of Arrival (OTDOA) technique, an Assisted Global Navigation Satellite System (A-GNSS) technique, and an Enhanced Cell Identification (E-CID) technique. Generally speaking, the OTDOA technique involves the UE's measurement of downlink signals from various base stations (called eNodeBs in the LTE standard), the A-GNSS technique involves the usage of GPS signals by the UE, and the E-CID technique involves using the knowledge of which cell that the mobile station is currently located as a rough proxy for its current location. The interested reader can find more information about these current LTE positioning techniques in the standard document 3GPP TS 36.355 V9.0.0 (2009-12), entitled "3rd Generation Partnership Project; Technical Specification Group Radio Access Network; Evolved Universal Terrestrial Radio Access (E-UTRA); LTE Positioning Protocol (LPP) (Release 9).

The positioning techniques currently selected for LTE suffer from some drawbacks. For example, OTDOA accuracy is limited by the UE's available processing power, A-GNSS suffers from relatively high failure rates in urban environments where the GPS signal penetration may be poor and E-CID is inherently a relatively low accuracy solution depending upon factors such as cell size. Thus it may be useful to consider enabling other, potentially higher accuracy positioning techniques to be usable in LTE systems.

One possibility is to use an uplink time of arrival or time difference of arrival positioning technique wherein adjunct units (e.g., eNBs and/or LMUs) measure a special signature transmitted by a UE when it is desirable to determine that UE's position. Such adjunct systems have been shown to provide relatively high positioning accuracy in older, e.g., time division multiple access (TDMA), radiocommunication systems. However, the reuse factor in such older radiocommunication systems was much higher than the reuse factor proposed for next generation systems, i.e., adjacent cells in next generation systems are intended to be able to reuse the same radio resources. This means that, on average, positioning signals transmitted on the uplink (i.e., UE to network direction) will experience significantly more intercell interference in next generation systems than they would have been expected to experience in older, e.g., TDMA, systems with higher reuse factors. Due to the high interference level, the failure rate of such uplink-based TOA or TDOA measurements in neighboring cells will, in operation, likely be unacceptably high for most implementations.

Accordingly, it would be desirable to provide devices, systems and methods for user equipment positioning which overcome the afore-mentioned drawbacks.

SUMMARY

According to exemplary embodiments, a serving eNodeB can share positioning scheduling information with cooperating eNodeBs which shall measure positioning signals transmitted by a user equipment on the uplink. The cooperating eNodeBs can use the positioning scheduling information to mitigate interference to the positioning signals, e.g., by re-allocating uplink transmission resources being used by other user equipments, so that the positioning signals can be received with a sufficiently high signal-to-interference ratio that they can be used to determine the position of the user equipment which is transmitting those positioning signals. This provides, among other advantages and benefits, for a high accuracy positioning system without using an adjunct measurement system which will operate with a low failure rate even for wireless communication systems which reuse all of the available bandwidth in adjacent cells. It should be noted however, that these (and other) advantages associated with exemplary embodiments which are described herein are not required by, or limitations of, the present invention except to the extent that they are explicitly recited in the claims.

According to one exemplary embodiment, a method for determining a position of user equipment (UE) includes transmitting, by a serving eNodeB (eNB), positioning scheduling information to the UE, wherein the positioning scheduling information is usable by the UE to transmit at least one positioning signal, transmitting, by the serving eNB, the positioning scheduling information to a first set of cooperating eNBs, wherein the positioning scheduling information is usable by the first set of cooperating eNBs to identify the at least one positioning signal and to mitigate interference associated with the at least one positioning signal, receiving, by the serving eNB, the at least one positioning signal, and receiving, by the serving eNB, information associated with reception of the at least one positioning signal by the first set of cooperating eNBs.

According to another exemplary embodiment, a communication node includes a wireless transceiver configured to transmit and receive signals over an air interface toward and from user equipment (UE), respectively, a processor, connected to the wireless transceiver, and configured to control the wireless transceiver to transmit positioning scheduling information to the UE, wherein the positioning scheduling information is usable by the UE to transmit at least one positioning signal, an interface, connected to the processor, configured to transmit the positioning scheduling information to a first set of cooperating eNBs, wherein the positioning scheduling information is usable by the first set of cooperating eNBs to identify the at least one positioning signal and to mitigate interference associated with the at least one positioning signal, wherein the wireless transceiver is further configured to receive the at least one positioning signal, and wherein the interface is further configured to receive information associated with reception of the at least one positioning signal by the first set of cooperating eNBs.

According to yet another exemplary embodiment, a method for assisting in a determination of a position of user equipment (UE) includes receiving, by a cooperating eNodeB (eNB), information associated with at least one positioning signal to be transmitted by the UE which is communicating with a serving eNB, receiving, by the cooperating eNB, a command to mitigate interference associated with the at least one positioning signal, adapting, by the cooperating eNB, communication resources used by another UE which is communicating with the cooperating eNB to mitigate the interference, receiving, by the cooperating eNB the at least one positioning signal, and transmitting, by the cooperating eNB, positioning information associated with reception of the at least one positioning signal toward the serving eNB.

According to still another exemplary embodiment, a communication node includes an interface configured to receive information associated with at least one positioning signal to be transmitted by a user equipment (UE) which is communicating with a serving eNB, and further configured to receive a command to mitigate interference associated with the at least one positioning signal, a processor, connected to the interface, configured to adapt communication resources used by another UE which is communicating with the cooperating eNB to mitigate the interference in response to receipt of the command, and a wireless transceiver, connected to the processor, configured to transmit and receive signals over an air interface toward and from user equipment (UE), respectively, including being configured to receive the at least one positioning signal, wherein the processor is further adapted to transmit positioning information associated with reception of the at least one positioning signal toward the serving eNB via the interface.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

According to exemplary embodiments, a serving eNodeB can share positioning scheduling information with cooperating eNodeBs which shall measure positioning signals transmitted by a user equipment on the uplink. The cooperating eNodeBs can use the positioning scheduling information to mitigate interference to the positioning signals, e.g., by re-allocating uplink transmission resources being used by other user equipments, so that the positioning signals can be received with a sufficiently high signal-to-interference ratio that they can be used to determine the position of the user equipment which is transmitting those positioning signals.

Figure 1:
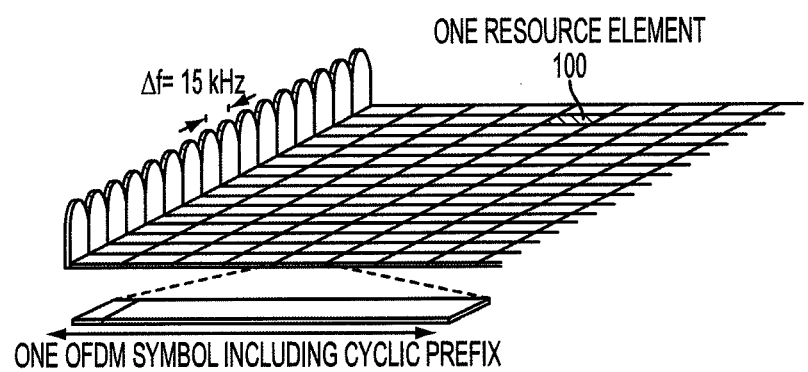
FIGS. 1-3 illustrate various aspects of downlink LTE data transmission.
Figure 2:
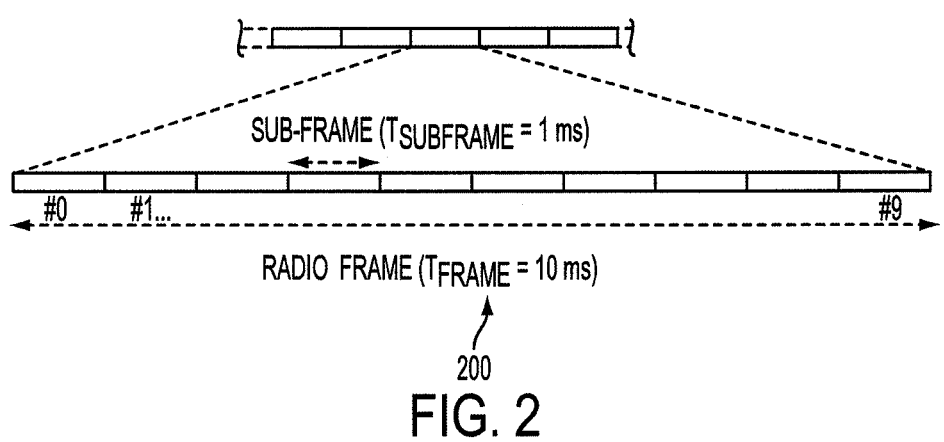
Figure 3:
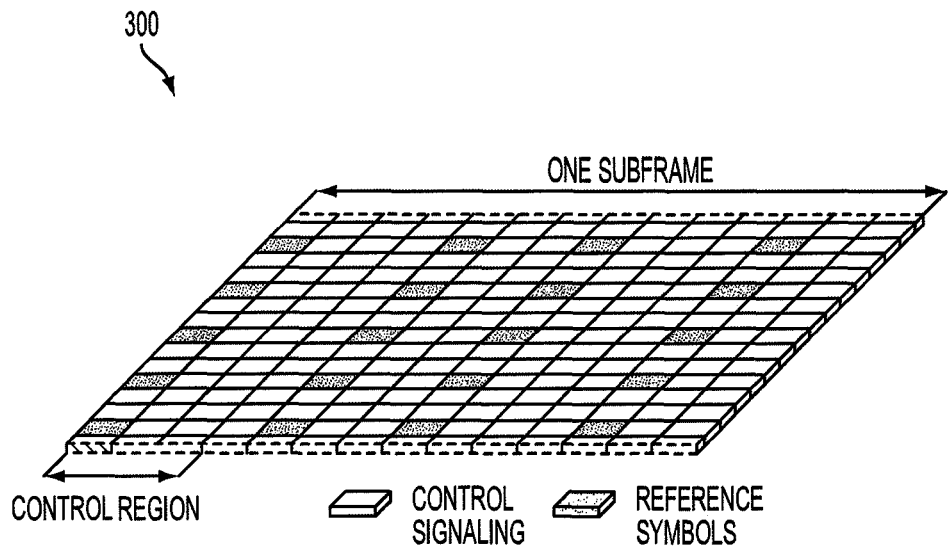

In order to provide some context for a more detailed discussion of these embodiments, an exemplary LTE system in which such embodiments can be implemented will first be described with respect to FIGS. 1-3. LTE systems use orthogonal frequency division multiplexing (OFDM) as an access methodology in the downlink and discrete Fourier transform (DFT)-spread OFDMA as an access methodology in the uplink. The basic LTE downlink physical resource can thus be seen as a time-frequency grid, an example of which is illustrated in FIG. 1. Therein, each resource element 100 corresponds to one OFDM subcarrier during one OFDM symbol interval. In the time domain, LTE downlink transmissions are organized into radio frames of 10 ms, each radio frame 200 consisting of ten equally-sized subframes of length $T_{subframe}=1$ ms as shown in FIG. 2.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the base station (typically referred to as an eNB in LTE) transmits control information indicating to which terminals and on which resource blocks the data is transmitted during the current downlink subframe. This control signaling is typically transmitted in the first 1, 2, 3 or 4 OFDM symbols in each subframe. A downlink system with a subframe 300 having three OFDM symbols as the control region is illustrated in FIG. 3.

LTE uses hybrid-ARQ where, after receiving downlink data in a subframe, the terminal attempts to decode it and reports to the base station whether the decoding was successful (ACK) or not (NAK). In case of an unsuccessful decoding attempt, the base station can retransmit the erroneous data. Uplink control signaling from the terminal to the base station thus consists of: hybrid-ARQ acknowledgements for received downlink data; terminal reports related to the downlink channel conditions, used as assistance for the downlink scheduling (also known as Channel Quality Indicator (CQI)); and scheduling requests, indicating that a mobile terminal needs uplink resources for uplink data transmissions.

If the mobile terminal has not been assigned an uplink resource for data transmission, the L1/L2 control information (channel-status reports, hybrid-ARQ acknowledgments, and scheduling requests) is transmitted in uplink resources (resource blocks) specifically assigned for uplink L1/L2 control information on the Physical Uplink Control Channel (PUCCH). Different PUCCH formats are used for the different information, e.g. PUCCH Format 1a/1b are used for hybrid-ARQ feedback, PUCCH Format 2/2a/2b for reporting of channel conditions, and PUCCH Format 1 for scheduling requests. To transmit data in the uplink the mobile terminal has to be assigned an uplink resource for data transmission, on the Physical Uplink Shared Channel (PUSCH).

Figure 4:
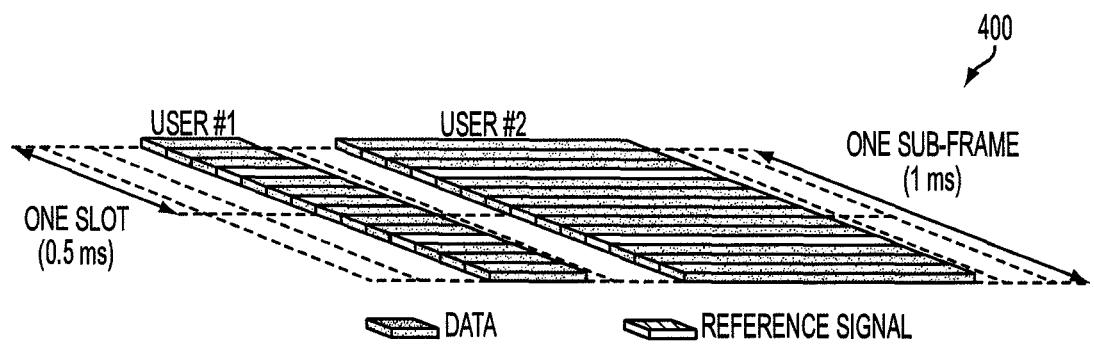
FIG. 4 illustrates various aspects of uplink LTE data transmission.

LTE uplink transmission resources are similar to, but not identical to, LTE downlink transmission resources. Thus, in the frequency domain, the uplink DFTS-OFDM subcarrier spacing is 15 kHz and each resource block also consists of 12 subcarriers in the uplink. Considered in the time domain each 1 ms uplink subframe includes two timeslots of length 0.5 ms. Each timeslot includes a number of DFT blocks including a cyclic prefix (CP)—either a normal CP or an extended CP. In contrast to a data assignment in the downlink, in the uplink the assignment is currently always consecutive in frequency, in order to retain the single carrier property of the uplink as illustrated by the uplink subframe 400 shown in FIG. 4. In LTE Rel-10 this restriction may, however, be relaxed thereby enabling non-noncontiguous uplink transmissions.

Figure 5:
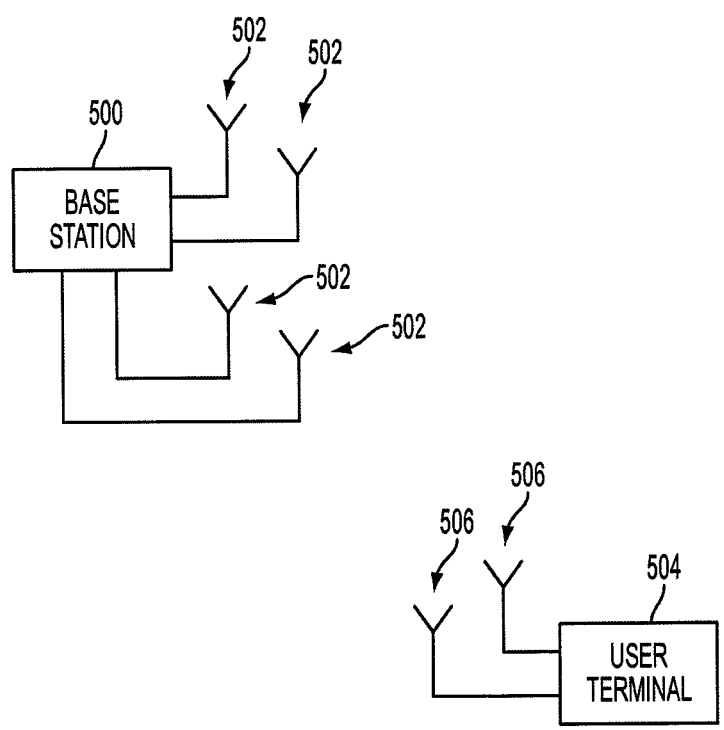
FIG. 5 depicts an exemplary multi-antenna base station and multi-antenna mobile station.

To increase the transmission rate of the systems, and to provide additional diversity against fading on the radio channels, modern wireless communication systems such as LTE systems may include transceivers that use multi-antennas (often referred to as a MIMO systems). The multi-antennas may be distributed to the receiver side, to the transmitter side and/or provided at both sides as shown in FIG. 5. More specifically, FIG. 5 shows a base station 500 having four antennas 502 and a user terminal (also referred to herein as "user equipment" or "UE") 504 having two antennas 506. The number of antennas shown in FIG. 5 is exemplary and is not intended to limit the actual number of antennas used at the base station 500 or at the user terminal 504 in the exemplary embodiments to be discussed below.

Additionally, it should be noted that the term "base station" is used herein as a generic term. As will be appreciated by those skilled in the art, in the LTE architecture an evolved NodeB (eNodeB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells, as shown for example in FIG. 6.

Figure 6:
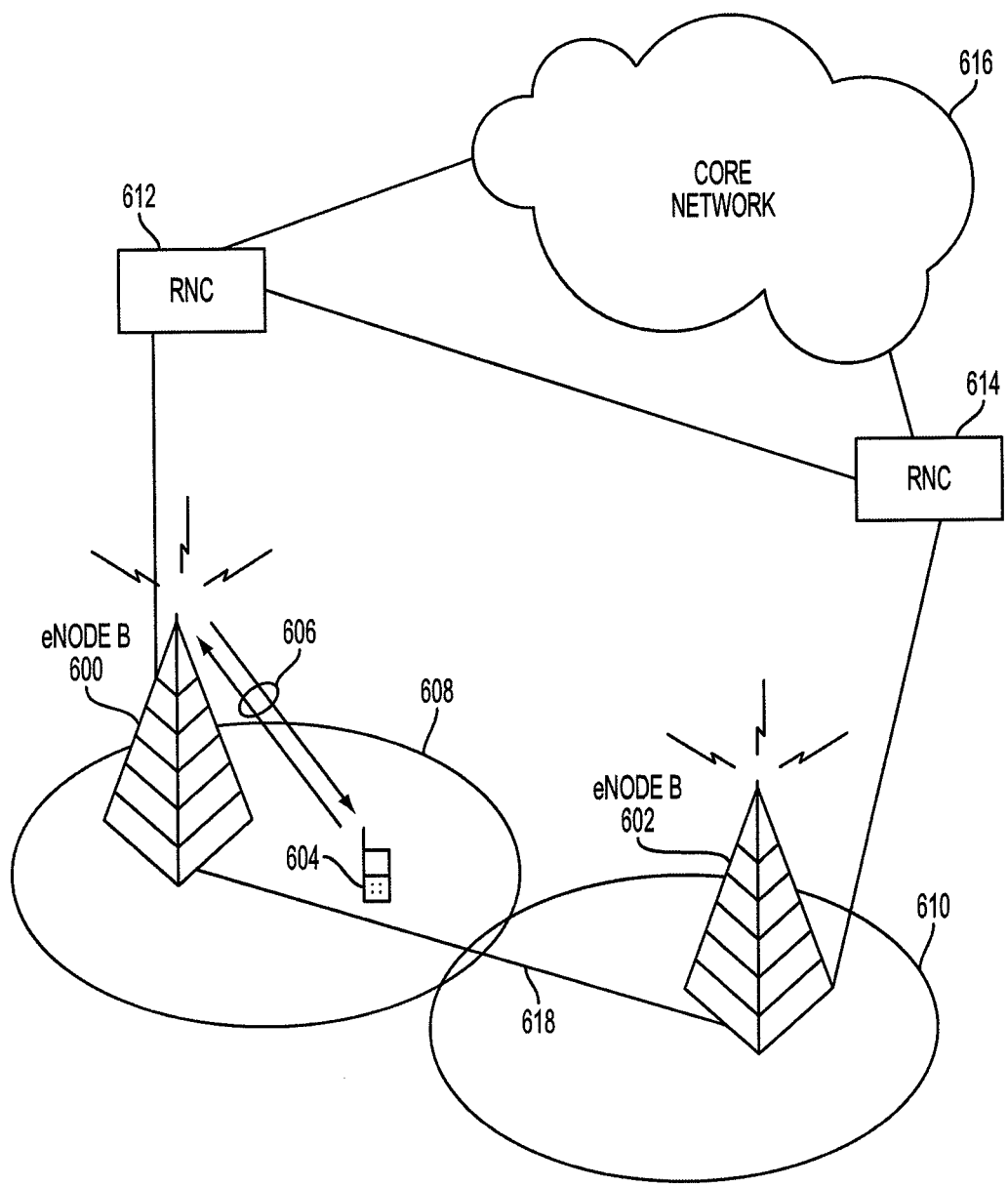
FIG. 6 shows an exemplary radiocommunication system in which exemplary embodiments can be implemented.

FIG. 6 illustrates, among other things, two eNodeBs 600, 602 and one user terminal (also sometimes referred to as "user equipment", UE) 604. The user terminal 604 uses dedicated channels 606 to communicate with the eNodeB 600, e.g., including receiving scheduling information signals from eNodeB 600 and transmitting positioning related signals toward eNodeB 600 (and other eNodeBs) according to exemplary embodiments described below. The geographic area in which transmissions occur between an eNodeB 600 and UEs is typically referred to as a cell 608. In this description, the eNodeB 600 to which a user terminal 604 is currently connected, e.g., whether involved in an active call or not, is referred to as the "serving" eNodeB, whereas other, nearby eNodeBs 602 are referred to herein as "cooperating" eNodeBs since, according to exemplary embodiments, they cooperate with the serving eNodeB to mitigate interference associated with positioning signals transmitted by user terminal 604. Although only one cooperating eNodeB 602 (and its corresponding cell 610) is illustrated in FIG. 6, it will be appreciated by those skilled in the art that cell 608 would typically be surrounded by other cells and corresponding eNodeBs which may also cooperate with serving eNodeB 600 according to exemplary embodiments. Moreover, it should be further appreciated that cooperating eNodeBs need not be directly adjacent to the cells with whose positioning functions they are cooperating.

The two eNodeBs 600, 602 are connected to corresponding Radio Network Controllers (RNC) 612, 614, respectively. Although not shown as such in FIG. 6, it will also be appreciated that each RNC may control more than one eNodeB. The RNCs 612, 614 are connected to a Core Network 616. Additionally, the eNodeBs 600 and 602 are directly connected with one another via an X2 interface 618.

Figure 7:
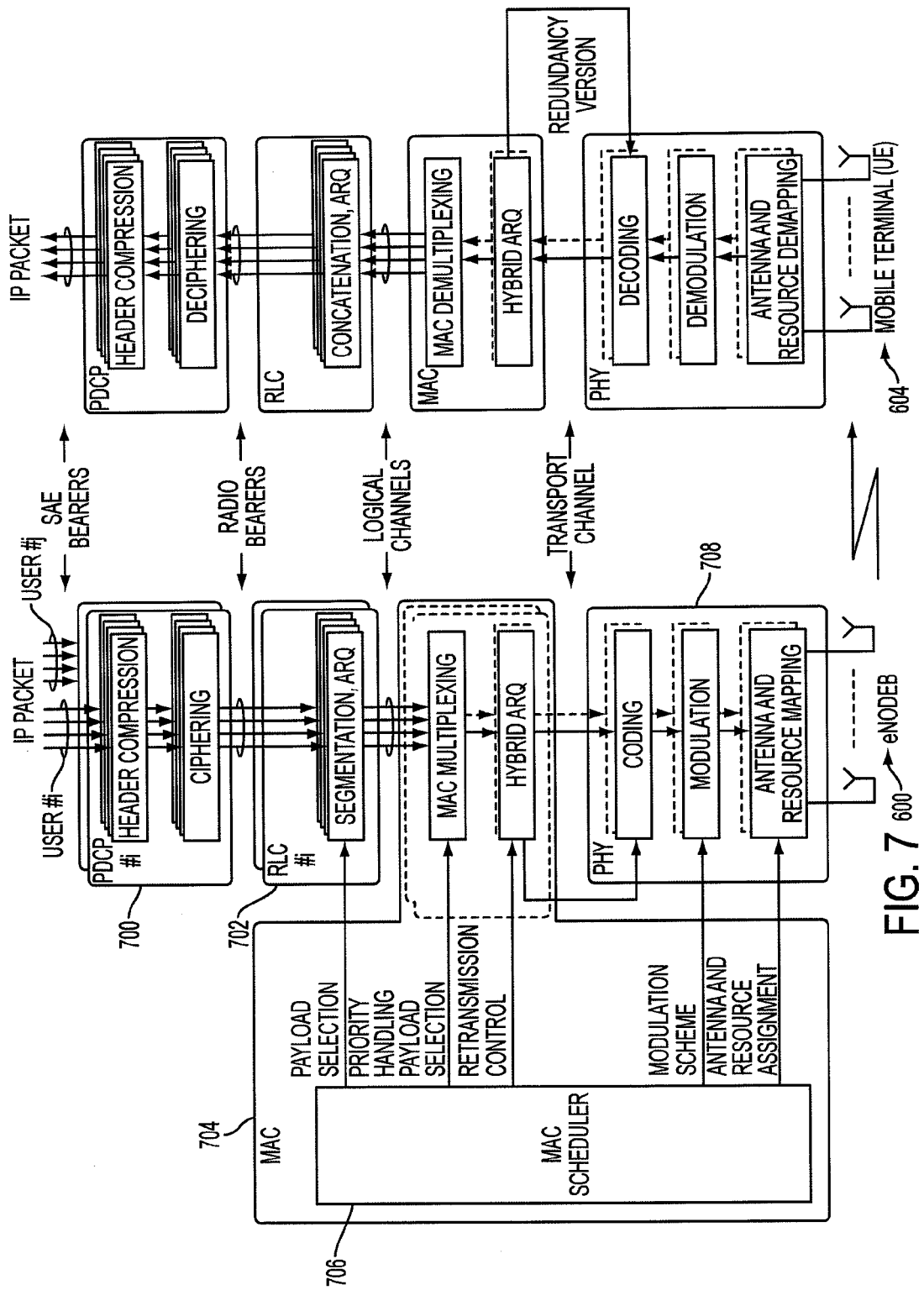
FIG. 7 shows function processing blocks of a transmit chain and a receive chain of an eNodeB and mobile terminal, respectively, which can be used in conjunction with exemplary embodiments.

One exemplary LTE architecture for processing data for transmission by an eNodeB 600 to a UE 604 (downlink) is shown in FIG. 7. Therein, data to be transmitted by the eNodeB 600 (e.g., IP packets) to a particular user is first processed by a packet data convergence protocol (PDCP) entity 700 in which the IP headers are (optionally) compressed and ciphering of the data is performed. The radio link control (RLC) entity 702 handles, among other things, segmentation of (and/or concatenation of) the data received from the PDCP entity 700 into protocol data units (PDUs). Additionally, the RLC entity 702 provides a retransmission protocol (ARQ) which monitors sequence number status reports from its counterpart RLC entity in the UE 604 to selectively retransmit PDUs as requested. The medium access control (MAC) entity 704 is responsible for uplink and downlink scheduling via scheduler 706, as well as the hybrid-ARQ processes discussed above. A physical (PHY) layer entity 708 takes care of coding, modulation, and multi-antenna mapping, among other things. Each entity shown in FIG. 7 provides outputs to, and receives inputs from, their adjacent entities by way of bearers or channels as shown. The reverse of these processes are provided for the UE 604 as shown in FIG. 7 for the received data, and the UE 604 also has similar transmit chain elements as the eNB 600 for transmitting on the uplink toward the eNB 600.

Figure 8:
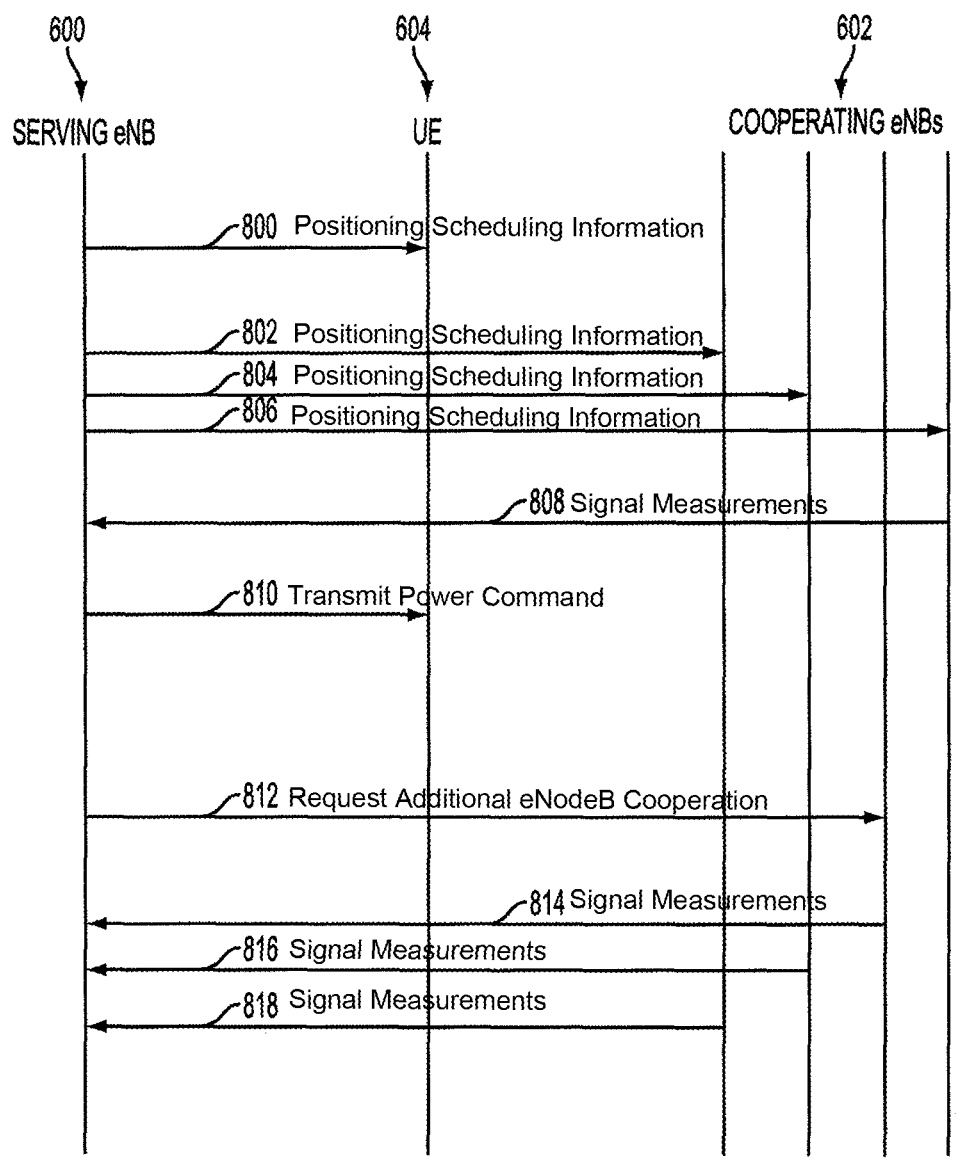
FIG. 8 is a signaling diagram illustrating signaling associated with positioning according to an exemplary embodiment.

Having described an exemplary LTE system in which exemplary embodiments can be implemented, the discussion now returns to positioning and the coordination of intercell interference associated with positioning signals according to exemplary embodiments, starting with the signaling diagram of FIG. 8. Therein, the serving eNodeB 600 transmits positioning scheduling information to the UE 604 via signal (e.g., SIP INVITE signal) 800. The positioning scheduling information in signal 800 is usable by the UE 604 to transmit at least one positioning signal over the air interface, which the UE 604 begins to do at this time. Among other information, the positioning scheduling information which is sent to the UE 604 in signal 800 can include, for example, the type of signal waveform (signature) to be used to transmit the positioning signal, the assigned transmit time interval(s) (TTIs) on which the UE 604 is to transmit the positioning signal and the assigned resource blocks (RBs) on which the UE 604 is to transmit the positioning signal.

The serving eNodeB 600 also transmits positioning scheduling information to a first set of cooperating eNBs via signals 802, 804 and 806. This positioning scheduling information is usable by the first set of cooperating eNBs 602 according to this exemplary embodiment to identify the at least one positioning signal which is transmitted by UE 604 and, also, to mitigate interference associated with the at least one positioning signal. Note that although three cooperating eNodeBs 602 are illustrated as being in the first set in FIG. 8, that more or fewer cooperating eNodeBs 602 can be included in the first set. Various examples regarding how the first and/or second set of cooperating eNBs 602 can be selected are discussed below. The information included in signals 802, 804 and 806 can include, for example, one or more of the type of signal waveform (signature) to be used to transmit the positioning signal, the assigned transmit time interval(s) (TTIs) on which the UE 604 is to transmit the positioning signal (semi-persistent scheduling (SPS) may be used), the assigned resource blocks (RBs) on which the UE 604 is to transmit the positioning signal, demodulation reference signal (DMRS) information and/or sounding reference signal (SRS) information.

The information signals may be transmitted from the serving eNodeB 600 to the cooperating eNodeBs 602 via an X2 interface 618. The X2 interface 618, originally implemented in LTE for facilitating inter-eNodeB handovers, is used according to exemplary embodiments to enable interference mitigation for positioning purposes. More specifically, yet purely as an illustrative example, some or all of the information discussed above can be transmitted in signals 802, 804 and 806 to the cooperating eNodeBs 602 via an intercell interference command (ICIC), such as the UL Interference Overload Indication command, on the X2 interface 618, both to enable these cooperating eNodeBs 602 to identify an uplink received signal as a positioning signal from a UE located in another cell and to also enable the cooperating eNodeBs 602 to mitigate interference to such positioning signals. Such interference mitigation can be performed by, for example, adapting the communication resources used by another UE which is communicating with a cooperating eNB to mitigate interference to the positioning signal of the UE 604.

For example, suppose that a cooperating eNodeB 602 determines, based on information received from the serving eNodeB 600 over the X2 interface 618, that another UE (not shown in FIG. 6) located in cell 610 is scheduled to transmit on the same TTI and same RBs as those on which the UE 604 is scheduled to transmit its positioning signal. In this case, the cooperating eNodeB 602 can reassign the UE located in its cell 610 to at least one of another transmit time interval and another set of resource blocks based upon the information which the cooperating eNodeB 602 received from the serving eNodeB 600, so that the UE's contribution to the uplink interference associated with the positioning signal is minimized. The other cooperating eNodeBs 602 in the first set can evaluate the scheduled transmissions associated with UEs which they are serving and may similarly adapt scheduled transmit resources to minimize their uplink interference with respect to the positioning signal.

The cooperating eNodeBs 602 will then start to receive the UE 604's positioning signal (as will the serving eNodeB 600) and make measurements on the received positioning signal, e.g., time-of-arrival (TOA) and/or signal quality (strength) measurements. The signal quality measurement can, for example, be a signal-to-interference-plus-noise ratio (SINR) of the received positioning signal over a predetermined period of time. According to one exemplary embodiment, those cooperating eNodeBs 602 which are successful in measuring TOA and signal quality will send this information back to the serving eNodeB 600, e.g., as represented by signal 808, via the X2 interface 618. If a sufficient number of the cooperating eNodeBs 602 are successful in measuring the TOA and/or signal quality, then the serving eNodeB 600 will have sufficient information to determine the position of UE 604 and the process can terminate. Alternatively, if insufficient information is returned to the serving eNodeB 600, e.g., if the number of cooperating eNodeB's 602 is set to the minimum number needed to determine the UE 604's location and one of them fails to accurately receive the positioning signal, then the process according to exemplary embodiments may continue in one of a plurality of ways. Moreover, it should be noted that the position determination for the UE 604 need not be performed by the serving eNodeB 600 but could alternatively be performed by one of the cooperating eNodeBs 602 or by another node or entity.

According to one exemplary embodiment, described in more detail below, the serving eNodeB 600 can transmit a signal 810 to the UE 604 commanding the UE 604 to increase the transmit power at which it retransmits the positioning signal. This can be (optionally) coupled with the transmission of a further instruction via the X2 interface 618 to the cooperating eNodeBs 602 to prepare for reception of another positioning signal from UE 604. Alternatively, the cooperating eNodeBs 602 can continue to monitor the positioning signal's TTI/RBs until they receive a signal indicating that the UE 604's position has been successfully determined.

Alternatively, or in conjunction with adapting the UE 604's transmit power, the serving eNodeB 600 can request one or more additional eNodeBs 602 to cooperate in the process by listening for the UE 604's positioning signal, as represented by signal 812. Thus, the serving eNodeB 600 can transmit the positioning scheduling information to a second set of cooperating eNBs 602, i.e., which is different from the first set of cooperating eNBs, wherein the positioning scheduling information is usable by the second set of cooperating eNBs 602 to identify the at least one positioning signal and to mitigate interference associated with the at least one positioning signal, e.g., in the same or similar manner as described above with respect to the first set of cooperating eNodeBs 602.

All of the cooperating eNodeBs 602, e.g., those in both the first and second set, will then listen for positioning signals from the UE 604 and will send reports upon successful TOA and signal quality measurement back to the serving eNodeB 600, e.g., as represented by signals 814, 816 and 818 in FIG. 8. Upon receipt of sufficient information, the serving eNodeB 600 can successfully determine the UE 604's position and the positioning process according to this exemplary embodiment can terminate. Note that although uplink power control is illustrated as being performed prior to adding a second set of cooperating eNodeBs, that this order may be reversed. Alternatively, either uplink power control or adding a second set of cooperating eNodeBs may be omitted.

Figure 9:
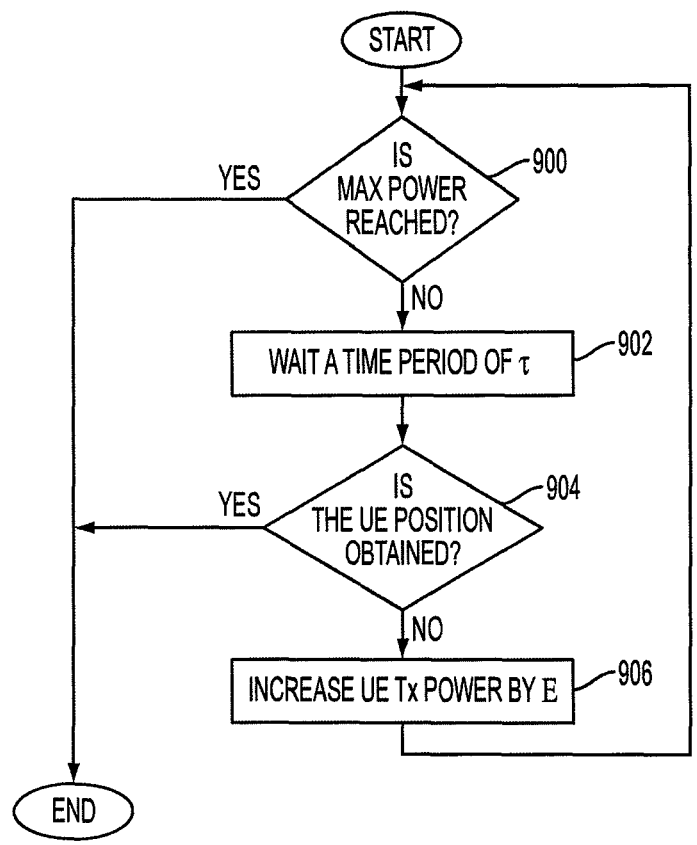
FIG. 9 is a flowchart illustrating uplink transmit power boosting according to an exemplary embodiment.

As mentioned above, uplink power control may optionally be employed during the positioning process to aid the cooperating eNodeBs 602 to receive the positioning signal(s) from UE 604 with appropriate signal quality to provide the desired measurements. If used, uplink transmit power control can be adapted as, for example, shown in FIG. 9 from the perspective of the serving eNodeB 600 (or network). Therein, at step 900, it is determined whether the maximum uplink transmit power has already been reached. If so, the process terminates since no further increases in UE transmit power are permitted. If not, the flow proceeds to step 902, where a delay between uplink transmit power increases is provided in order to allow sufficient time to determine whether a previous increase was sufficient to enable enough positioning information to be collected by the cooperating eNodeBs 602. At step 904, if the UE 604's position has been determined as a result of information which was previously reported by the cooperating eNodeBs 602 (as described above), then the process terminates. Otherwise, if the UE 604's position has not yet been determined, then the flow proceeds to step 906 wherein the UE 604's transmit power is increased by an increment E, i.e., by transmitting a TX power control command from the serving eNodeB 600 to the UE 604. This exemplary power control process iterates until either the maximum transmit power control is reached, or the UE 604's position is determined Those skilled in the art will appreciate that other, optional power control techniques may be used instead of that illustrated in FIG. 9.

According to exemplary embodiments, various techniques or criteria may be used to select which eNodeBs to include in the first and/or second sets of cooperating eNodeBs 602. The selection space can, for example, include all eNodeBs (cells) which are currently in the serving eNodeB 600's neighbor list, i.e., those eNodeBs which are identified to the UE 604 for downlink signal quality measurements as being potential handover candidates. A ranking of the eNodeBs in the neighbor list can be performed, e.g., based on their respective horizontal dilution of precision (HDOP) values. For example, those neighboring cells with higher HDOP values can be associated with a higher weight in the selection process than those with lower HDOP values. According to one exemplary embodiment, the first set S1 of cooperating eNodeBs 602 can contain a first predetermined number of cells, e.g., three, having the highest HDOP values, and the second set S2 of cooperating eNodeBs can contain those other neighboring cells which are not in the first set S1 (or a second predetermined number, e.g., one, of those cells not in the first set S1).

Figure 10:
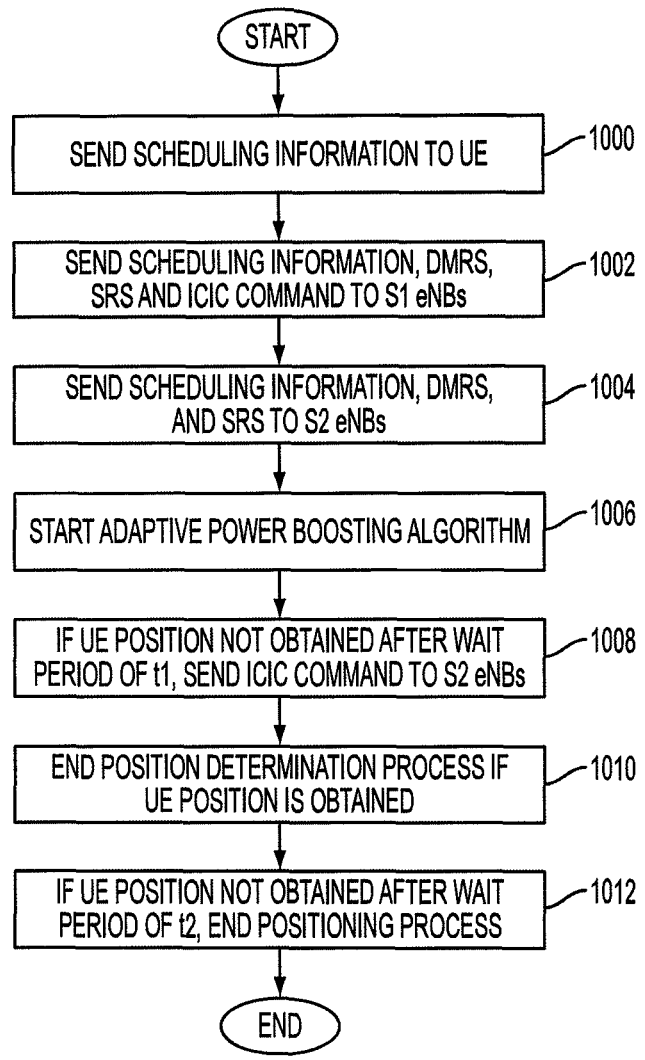
FIGS. 10-13 are flowcharts illustrating positioning methods according to various exemplary embodiments.

Various permutations of the afore-described techniques for determining UE position and mitigating interference, e.g., those techniques which are more or less aggressive in trying to rapidly determine the UE's position, will be apparent to those skilled in the art and are contemplated by the present invention. For example, as shown in FIG. 10, a relatively aggressive position determination method according to one exemplary embodiment is described. Therein, at step 1000, the scheduling information is sent to the UE. At step 1002, the scheduling information, DMRS, SRS and ICIC command are sent to the eNodeBs in the first set S1. At substantially the same time, as shown by step 1004, the scheduling information, DMRS and SRS information is sent to the cooperating eNodeBs in the second set S2 (but not the ICIC command). A UE transmit power boosting algorithm, e.g., that described above with respect to FIG. 9, can then be initiated at step 1006. If the UE position is not obtained after a predetermined wait period (t1), then the ICIC command is sent to the second set S2 of cooperating eNodeBs (step 1008). When the UE position is obtained (step 1010), or if the UE position is not obtained after a second predetermined wait period (t2, step 1012), the positioning process according to this exemplary embodiment is terminated.

Figure 11:
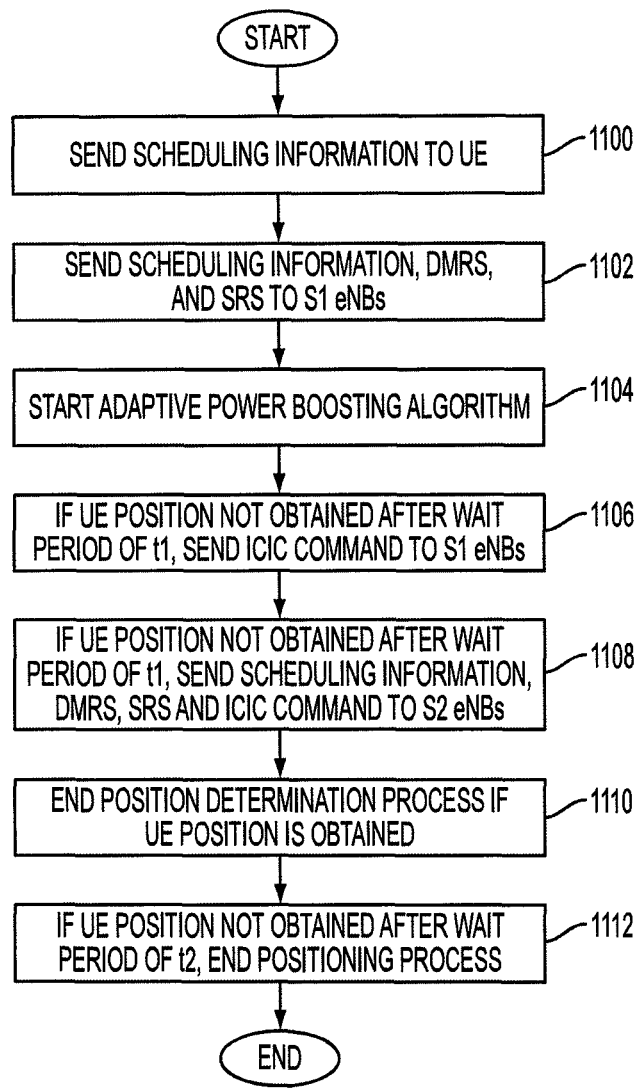

Another variation, illustrated in the flowchart of FIG. 11, provides a less aggressive (but more conservative of capacity) positioning determination technique according to an exemplary embodiment. Therein, the scheduling information is sent to the UE at step 1100. The scheduling information, DMRS and SRS is sent to the S1 eNBs at step 1102, but without the ICIC command so that the cooperating eNodeBs in the first set can listen for the positioning signal, but will not initially employ interference mitigation to aid in detecting the positioning signal. At step 1104, a UE transmit power boosting algorithm is initiated, e.g., the algorithm described above with respect to FIG. 9. If the UE position is not obtained after a wait period (t1), then at steps 1106 and 1108, the first set S1 is instructed to begin interference mitigation and a second set S2 is also brought into the cooperative process, respectively. When the UE position is obtained (step 1110), or if the UE position is not obtained after a second predetermined wait period (t2, step 1112), the positioning process according to this exemplary embodiment is terminated.

Figure 12:
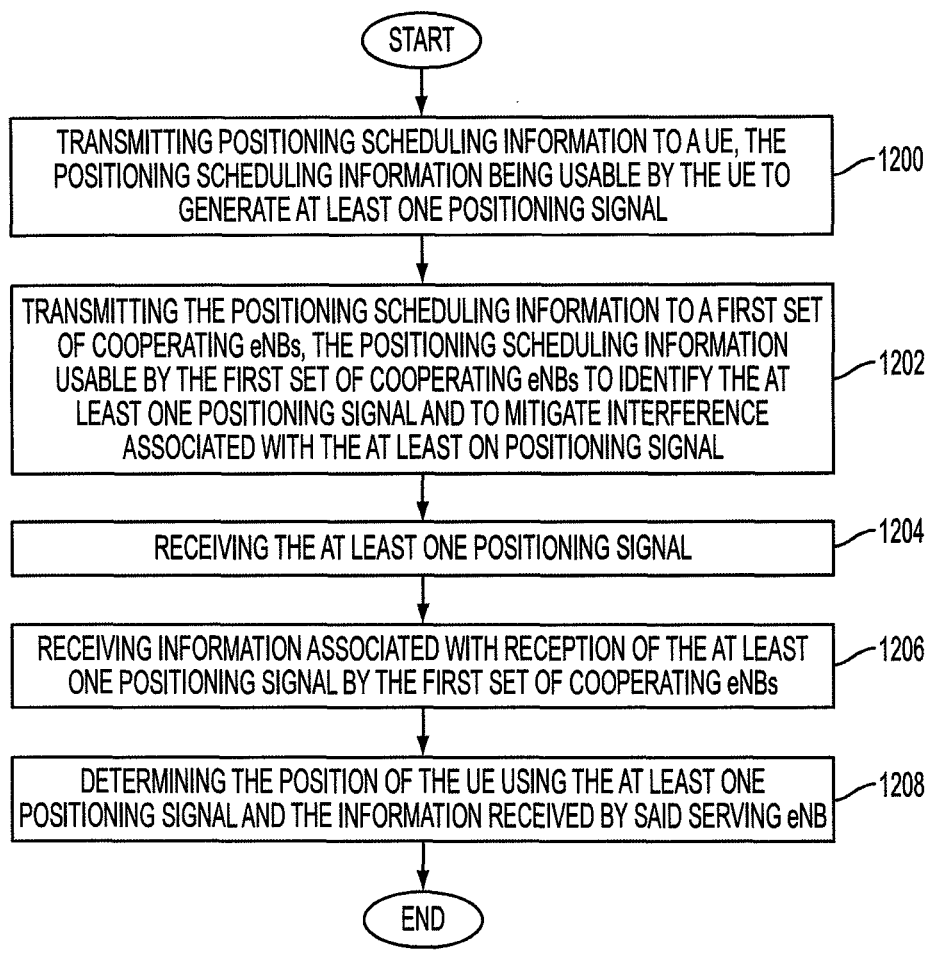

According to another exemplary embodiment, a method for determining a position of a UE can be expressed from the perspective of, for example, a serving eNodeB 600, as illustrated in the flowchart of FIG. 12. Therein, positioning scheduling information is transmitted to the UE, at step 1200, the positioning scheduling information being usable by the UE to transmit at least one positioning signal. The positioning scheduling information is also transmitted to a first set of cooperating eNBs, at step 1202, wherein the positioning scheduling information is usable by the first set of cooperating eNBs to identify the at least one positioning signal and to mitigate interference associated with the at least one positioning signal. The at least one positioning signal is received, at step 1204, by the serving eNodeB, which also receives information associated with reception of the at least one positioning signal by the first set of cooperating eNBs at step 1206. From this information, the serving eNodeB determines the position of the UE (if possible) using the at least one positioning signal and the information received by the serving eNB at step 1208. If not possible, the serving eNodeB can, as described above, invoke additional cooperating eNodeBs to measure the positioning signal and/or instruct the UE to boost its transmit power.

Figure 13:
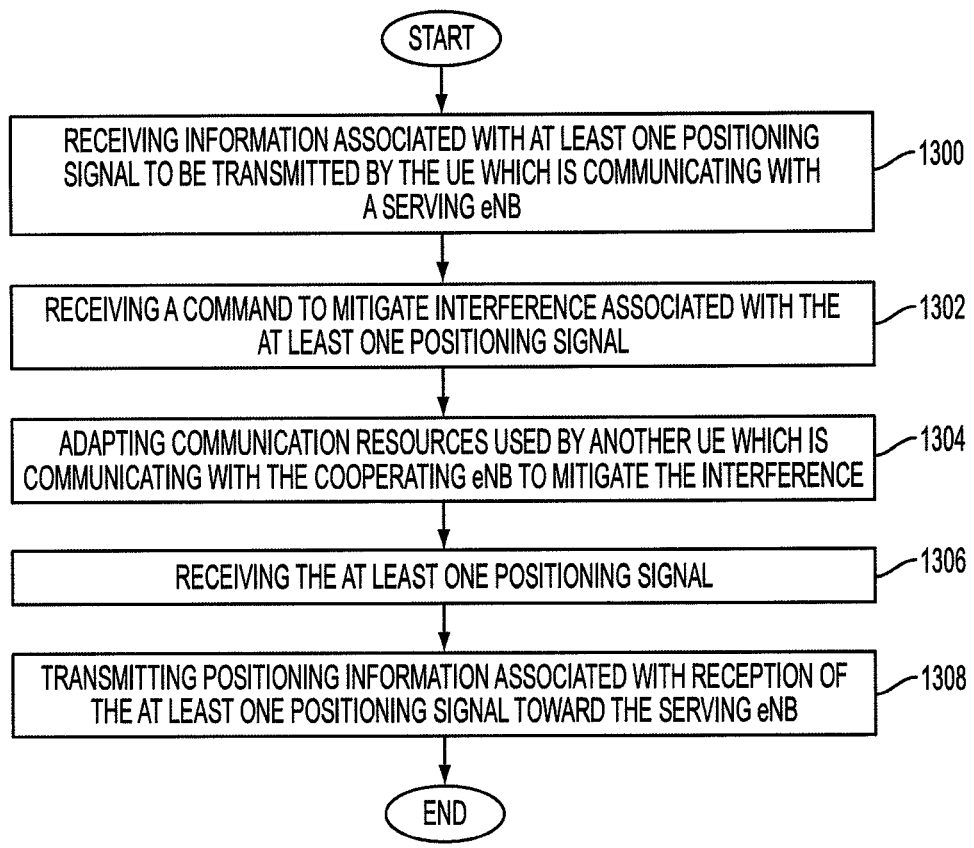

According to yet another exemplary embodiment, a method for assisting in a determination of a position of user equipment can be expressed from the perspective of, e.g., a cooperating eNodeB 602, as shown in the flowchart of FIG. 13. Therein, at step 1300, information associated with at least one positioning signal to be transmitted by UE which is communicating with a serving eNB is received. At the same time, or later, a command to mitigate interference associated with the at least one positioning signal is received at step 1302. In response to this command, the communication resources used by another UE which is communicating with the cooperating eNB are adapted to mitigate interference (with the positioning signal) at step 1304. The at least one positioning signal is received (step 1306) and positioning information, e.g., TOA information and/or signal quality information, associated with reception of the at least one positioning signal is transmitted toward the serving eNB at step 1308. It should be noted that, for example, steps 1306 and 1308 may also be performed prior to step 1302 and that, more generally, the steps illustrated in the various flowcharts and discussed methods associated therewith can be performed in orders other than those in which they are illustrated and/or discussed.

Figure 14:
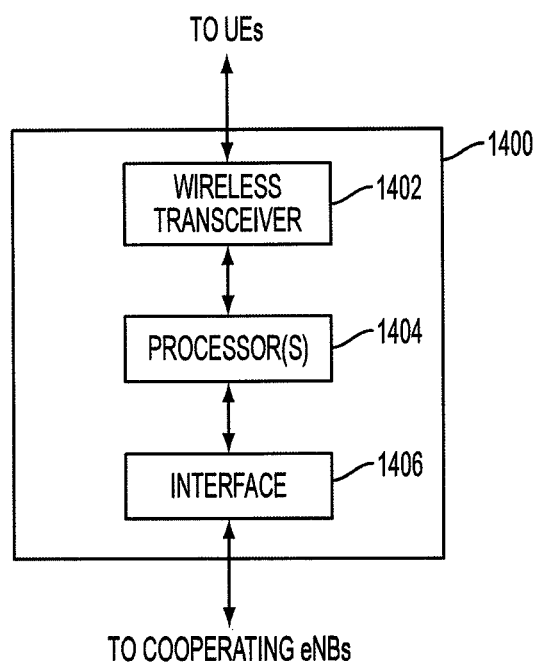
FIG. 14 depicts a communication node.

In addition to various methods, exemplary embodiments present communication nodes which are configured to implement the exemplary embodiments including, for example, serving and cooperating eNodeBs. An exemplary serving eNodeB 1400 is shown in FIG. 14. Therein, the communication node 1400 includes a wireless transceiver 1402 configured to transmit and receive signals over an air interface, e.g., as defined in the LTE specifications, toward and from UEs, respectively. The wireless transceiver 1402 is connected to, and controlled by, one or more processors 1404 to, for example, control the wireless transceiver 1402 to transmit positioning scheduling information to a UE. The communication node 1400 also includes an interface 1406, e.g., an X2 interface, connected to the processor(s) 1404. The interface 1406 can be configured by the processor(s) 1404 transmit position scheduling information, for example, to a first set of cooperating eNBs as discussed above. The communication node 1400 may include other components and may be equally representative of the cooperating eNodeBs described above.

Exemplary embodiments provide methods, devices and systems for UE positioning based on uplink TOA or TDOA measurements which include, for example, one or more of the following features: uplink interference coordination, uplink transmit power boosting, adaptive scheduling, and progressive signal enhancement. Among other benefits and advantages, such embodiments provide significant improvements in positioning accuracy even for difficult traffic cases with a minimum impact on uplink capacity and relatively uncomplicated inter-eNB signaling and coordination.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for collecting data associated with determining a position of user equipment (UE) comprising:
    transmitting, by a serving eNodeB, positioning scheduling information to said UE, wherein said positioning scheduling information is used by said UE to transmit at least one positioning signal;
    transmitting, by said serving eNB, said positioning scheduling information to a first set of cooperating eNBs, wherein said positioning scheduling information is used by said first set of cooperating eNBs to mitigate interference associated with and identify said at least one positioning signal, said first set of cooperating eNBs comprising a minimum number of cooperating eNBs needed to receive said at least one positioning signal and to provide sufficient information to said serving eNB to determine the position of the UE;
    receiving, by said serving eNB, said at least one positioning signal; and
    receiving, by said serving eNB, information associated with reception of said at least one positioning signal by at least one eNB in said first set of eNBs.

2. The method of claim 1, wherein the sufficient information provided to said serving eNB to determine the position of the UE comprises a time of arrival and signal strength measured by each cooperating eNB in the first set of cooperating eNBs from said at least positioning signal.

3. The method of claim 1, wherein said positioning scheduling information is used by said first set of cooperating eNBs to mitigate interference associated with said at least one positioning signal.

4. The method of claim 1, further comprising transmitting a signal from the server eNB to the UE to increase transmit power at which the UE retransmits the at least one positioning signal in response to a failure in at least one cooperating eNB in the first set of cooperating eNBs to accurately receive the at least one positioning signal.

5. The method of claim 4, further comprising increasing the transmit power at which the UE retransmits the at least one positioning signal by:
    determining if a maximum transmit power has been reached;
    establishing a delay between subsequent increases in transmit power;
    monitoring if the position of the UE has been determined based on previous transmissions of the at least one positioning signal; and increasing the transmit power by a given increment when the maximum transmit power has not been reached and the position of the UE has not been determined.

6. The method of claim 5, wherein increasing the transmit power further comprising transmitting power control command from the server eNB to the UE.

7. The method of claim 4, further comprising transmitting an instruction from the eNB to the first set of cooperating eNBs to prepare for reception of a retransmission of the at least one positioning signal.

8. The method of claim 1, further comprising transmitting, by said serving eNB, said positioning scheduling information to at least one additional cooperating eNB, wherein said positioning scheduling information is used by said additional cooperating eNB to identify said at least one positioning signal, said positioning scheduling information transmitted to said at least one additional cooperating eNB in response to a failure in at least one cooperating eNB in the first set of cooperating eNBs to accurately receive the at least one positioning signal.

9. The method of claim 1, further comprising transmitting, by said serving eNB, said positioning scheduling information to a second set of cooperating eNBs, wherein said positioning scheduling information is used by said second set of cooperating eNBs to identify said at least one positioning signal, said second set of cooperating eNBs separate from said first set of cooperating eNBs and said positioning scheduling information transmitted to said second set of cooperating eNBs in response to a failure in at least one cooperating eNB in the first set of cooperating eNBs to accurately receive the at least one positioning signal.

10. The method of claim 9, wherein said positioning scheduling information is used by said second set of cooperating eNBs to mitigate interference associated with said at least one positioning signal.

11. The method of claim 1, further comprising transmitting a signal from the server eNB to the UE to increase transmit power at which the UE retransmits the at least one positioning signal and transmitting, by said serving eNB, said positioning scheduling information to at least one additional cooperating eNB in response to a failure in at least one cooperating eNB in the first set of cooperating eNBs to accurately receive the at least one positioning signal.

12. A method for collecting data associated with determining a position of user equipment (UE) comprising:
transmitting, by a serving eNodeB, positioning scheduling information to said UE, wherein said positioning scheduling information is used by said UE to transmit at least one positioning signal;
transmitting, by said serving eNB, said positioning scheduling information and an intercell interference command to a first set of cooperating eNBs, wherein said positioning scheduling information is used by said first set of cooperating eNBs to identify said at least one positioning signal and said intercell interference command and said intercell interference command enables said first set of cooperating eNBs to mitigate interference of said at least one positioning signal;
transmitting, by said serving eNB, said positioning scheduling information to a second set of cooperating eNBs, wherein said positioning scheduling information is used by said second set of cooperating eNBs to identify said at least one positioning signal;
initiating a transmit power boosting algorithm to iteratively increase a transmit power of the UE by a given increment;
receiving, by said serving eNB, said at least one positioning signal transmitted at each given increment of transmit power; and
receiving, by said serving eNB, information associated with reception of said at least one positioning signal at each increment of transmit power by at least one eNB in said first or second set of eNBs.

13. The method of claim 12, further comprising:
transmitting, by said serving eNB, said intercell interference command to said second set of cooperating eNBs, said intercell interference command enables said second set of cooperating eNBs to mitigate interference of said at least one positioning signal and said intercell interference command transmitted when the position of the UE has not been determined following a first wait period; and
continuing the transmit power boosting algorithm.

14. The method of claim 13, further comprising terminating the determining of the position of the UE when the position of the UE has been determined or when the position of the UE has not been determined following a second wait period.

15. The method of claim 12, wherein the transmit power boosting algorithm comprises:
determining if a maximum transmit power has been reached;
establishing a delay between subsequent increases in transmit power;
monitoring if the position of the UE has been determined based on previous transmissions of the at least one positioning signal; and
increasing the transmit power by a given increment when the maximum transmit power has not been reached and the position of the UE has not been determined.

16. A method for collecting data associated with determining a position of user equipment (UE) comprising:
transmitting, by a serving eNodeB, positioning scheduling information to said UE, wherein said positioning scheduling information is used by said UE to transmit at least one positioning signal;
transmitting, by said serving eNB, said positioning scheduling information to a first set of cooperating eNBs, wherein said positioning scheduling information is used by said first set of cooperating eNBs to identify said at least one positioning signal;
initiating a transmit power boosting algorithm to iteratively increase a transmit power of the UE by a given increment;
receiving, by said serving eNB, said at least one positioning signal transmitted at each given increment of transmit power; and
receiving, by said serving eNB, information associated with reception of said at least one positioning signal at each increment of transmit power by at least one eNB in said first set of eNBs.

17. The method of claim 16, further comprising:
transmitting, by said serving eNB, an intercell interference command to a first set of cooperating eNBs, wherein said intercell interference command enables said first set of cooperating eNBs to mitigate interference of said at least one positioning signal;
transmitting, by said serving eNB, said positioning scheduling information and said intercell interference command to a second set of cooperating eNBs, wherein said positioning scheduling information is used by said second set of cooperating eNBs to identify said at least one positioning signal and said intercell interference command enables said second set of cooperating eNBs to mitigate interference of said at least one positioning signal, said intercell interference command transmitted to the first set of cooperating eNBs and said positioning scheduling information and said intercell interference command transmitted to said second set of cooperating eNBs when the position of the UE has not been determined following a first wait period; and continuing the transmit power boasting algorithm.

18. The method of claim 17, further comprising terminating the determining of the position of the UE when the position of the UE has been determined or when the position of the UE has not been determined following a second wait period.

19. The method of claim 16, wherein the transmit power boasting algorithm comprises:

determining if a maximum transmit power has been reached;

establishing a delay between subsequent increases in transmit power;

monitoring if the position of the UE has been determined based on previous transmissions of the at least one positioning signal; and increasing the transmit power by a given increment when the maximum transmit power has not been reached and the position of the UE has not been determined.

* * * * *